United States Patent [19]

Ichikawa et al.

[11] Patent Number: 5,506,322
[45] Date of Patent: Apr. 9, 1996

[54] ACRYLIC RUBBER COMPOSITION AND RUBBER HOSE OBTAINED USING THE SAME

[75] Inventors: Masayoshi Ichikawa; Atsushi Suzuki, both of Aichi, Japan

[73] Assignee: Toyoda Gosei Co., Ltd., Aichi, Japan

[21] Appl. No.: 454,625

[22] Filed: May 31, 1995

Related U.S. Application Data

[63] Continuation of Ser. No. 26,253, Mar. 4, 1993, abandoned, which is a continuation-in-part of Ser. No. 823,776, Jan. 22, 1992, abandoned.

[30] Foreign Application Priority Data

Jan. 28, 1991 [JP] Japan .................... 3-008014
Jan. 28, 1991 [JP] Japan .................... 3-008034

[51] Int. Cl.⁶ .............. C08F 224/00; C08F 226/06; C08F 226/02; C08F 220/10; C08F 210/02
[52] U.S. Cl. ............... 526/273; 526/261; 526/310; 526/328.5; 526/348.8; 524/248
[58] Field of Search ............... 526/273, 261, 526/310, 328.5, 348.8

[56] References Cited

U.S. PATENT DOCUMENTS

| | | | |
|---|---|---|---|
| 4,595,720 | 6/1986 | Stivers et al. | 524/100 |
| 4,822,654 | 4/1989 | Takemura et al. | 428/36.8 |
| 4,904,736 | 2/1990 | Shimizu et al. | 525/279 |

FOREIGN PATENT DOCUMENTS

63-312338 12/1988 Japan .
63-312339 12/1988 Japan .

*Primary Examiner*—Joseph L. Schofer
*Assistant Examiner*—Wu C. Cheng
*Attorney, Agent, or Firm*—Cushman Darby & Cushman

[57] ABSTRACT

The present invention relates to an acrylic rubber composition comprising a copolymer composition comprising ethylene monomer units and acrylic acid ester monomer units as main components, wherein said copolymer composition contains an epoxy group-containing cross-linkable compound in an amount of 1.2 to 3.0% by weight (wt %) and said rubber composition contains an isocyanuric acid and a quaternary ammonium salt as vulcanizing agents, and a rubber hose having at least one layer comprising the above acrylic rubber composition vulcanized.

9 Claims, 1 Drawing Sheet

ACRYLIC RUBBER COMPOSITION AND RUBBER HOSE OBTAINED USING THE SAME

This is a continuation of application Ser. No. 08/026,253, filed on Mar. 4, 1993, which was abandoned upon the filing hereof which is a CIP of Ser. No. 07/823,776 filed Jan. 22, 1992, now abandoned.

FIELD OF THE INVENTION

The present invention relates to an acrylic rubber (hereinafter abbreviated to as "AR") composition and a rubber hose comprising the vulcanized acrylic rubber composition, which exhibit a well-balanced combination of initial physical properties (especially, initial strength), resistance to permanent compression set, heat and oil, and eliminates the necessity of secondary vulcanization.

The AR composition is suited for use in producing oil hoses, such as torque converter hoses, engine oil hoses, and vacuum pump oil hoses, air hoses, such as turbo hoses, and rubber parts, such as head covers and oil pan gaskets, which are required to have heat, oil and permanent compress set resistance.

Following is a list of abbreviations used herein.
1. Polymer:
    AR . . . acrylic rubber
2. Monomer:
    n-BA . . . n-butyl acrylate
    EA . . . ethyl acrylate
    GMA . . . glycidyl methacrylate
3. Carbon black:
    MAF . . . medium abrasion furnace
    HAF . . . high abrasion furnace
4. Initial physical properties:
    $H_S$(JIS A) . . . degree of hardness (spring type hardness test of JIS K 6301 corresponding to ASTM D 2240)
    $T_B$ . . . tensile strength (kgf/cm$^2$) according to JIS K 6301

BACKGROUND OF THE INVENTION

With the recent trend toward temperature increases in automotive engine compartments, engine oil hoses and other rubber parts are required to have a higher resistance to deterioration by oils and heat. In order to meet this demand, an AR has been proposed in JP-A-63-312338, JP-A-63-312339, and others. (The term "JP-A" as used herein means an "unexamined published Japanese patent application".) This AR comprises an acrylic copolymer composition formed from ethylene monomer units and acrylic acid ester monomer units as major components.

The above-described AR, however, is unsuited for practical use without secondary vulcanization. The present inventors have found that this AR does not develop well-balanced initial properties and resistance to permanent compression set, oil and heat if it is vulcanized by primary vulcanization only. Because of the necessity of secondary vulcanization, production of rubber hoses using this material is inefficient.

Development of an AR composition which eliminates the necessity of secondary vulcanization is desirable from the standpoint of improving production efficiency.

SUMMARY OF THE INVENTION

An object of the present invention is to provide an AR composition which can produce a well-balanced combination of initial physical properties and resistance to permanent compression set, oil and heat without undergoing secondary vulcanization.

Another object of the present invention is to provide a rubber hose using the above AR composition, which can be produced efficiently.

Other objects (e.g., providing the excellent vulcanization curve characteristics) and the several advantages of the present invention are apparent from the following description.

The first embodiment of the present invention is an acrylic rubber composition comprising a copolymer composition comprising ethylene monomer units, acrylic acid ester monomer units as main components, wherein said copolymer composition contains an epoxy group-containing crosslinkable compound in an amount of 1.2 to 3.0% by weight (wt %) and said rubber composition contains a combination of isocyanuric acid and a quaternary ammonium salt as vulcanizing agents.

Another embodiment of the present invention is a rubber hose or the formed article comprising at least one layer of a vulcanized acrylic rubber obtained by vulcanizing an acrylic rubber composition of the first embodiment.

DETAILED DESCRIPTION OF THE INVENTION

Figure 1:
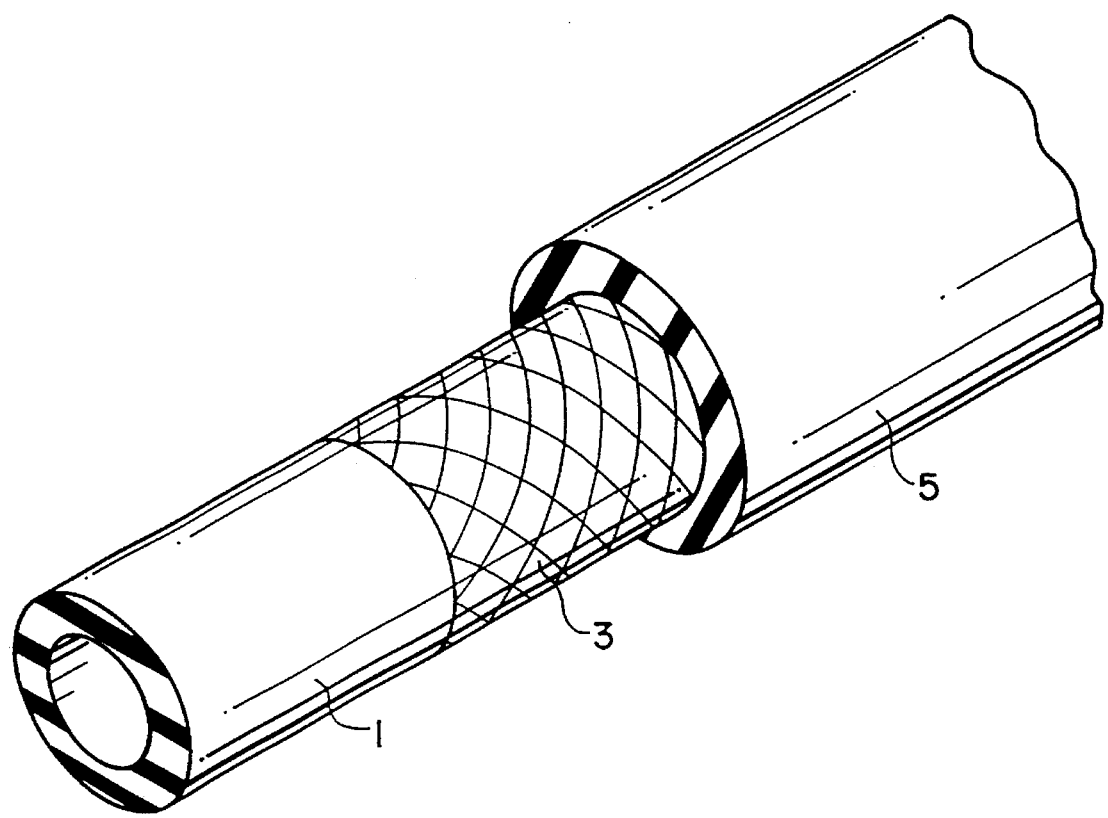
FIG. 1 is a perspective view illustrating an example of one embodiment of the present invention.

The AR composition of the present invention has, through primary vulcanization only, initial physical properties at or above the levels required for practical use and resistance to permanent compression set, oil and heat.

The AR composition of the present invention can be used for efficiently producing rubber products which have a vulcanized AR layer, such as diaphragms, rubber hoses for fuel, etc.

The vulcanized AR of the present invention can be used for any article requiring resistance to permanent compression set, oil or heat.

Carbon black can be added to the AR composition to improve extrudability and increase production efficiency.

The AR composition of the present invention comprises an acrylic copolymer composition formed from ethylene monomer units and acrylic acid ester monomer units as major components.

The content of units derived from ethylene monomer is from 3 to 10 wt % and that of units derived from an acrylic acid ester monomer is from 70 to 90 wt %. The acrylic copolymer composition may further comprise units derived from vinyl acetate in an amount up to 15 wt %.

Usable examples of acrylic acid esters include (1) alkyl esters of acrylic acid such as methyl acrylate, ethyl acrylate (EA), n-butyl acrylate (n-BA), methyl methacrylate, ethyl methacrylate, butyl methacrylate, and the like, and (2) (alkoxy-substituted)alkyl esters of acrylic acid such as 2-methoxyethyl acrylate (MEA), 2-ethoxyethyl acrylate, 2-(n-propoxy)ethyl acrylate, 3-methoxypropyl acrylate, and the like. It is particularly desirable that EA and n-BA be used in combination, the content of acrylic acid ester units derived from EA being 20 to 45 wt % and the content of the acrylic acid ester units from n-BA being 45 to 70 wt %.

One characteristic feature of the present invention is that the acrylic copolymer contains an epoxy group-containing crosslinkable compound in the acrylic copolymer composition in an amount of from 1.2 to 3.0 wt %.

If the amount of the epoxy group-containing crosslinkable compound is below 1.2 wt %, the number of crosslinkable sites present in the acrylic copolymer is so small that it is difficult to impart the desired strength to the vulcanized rubber obtained from the copolymer compositions. Amounts thereof exceeding 3.0 wt % are disadvantageous in that such a copolymer is difficult to obtain by ordinary copolymerization and that the copolymer has too many crosslinkable sites and hence gives a vulcanized rubber which is too hard.

Examples of the epoxy group-containing cross-linkable compound include glycidyl acrylate (GA), glycidyl methacrylate (GMA), vinyl glycidyl ether, allyl glycidyl ether (AGE), and the like. Of these, GA and GMA are preferred.

Another characteristic feature of the present invention is that the vulcanizing agent in the AR rubber composition comprises a combination of isocyanuric acid and a quaternary ammonium salt.

In the vulcanizing agent, the weight ratio of the isocyanuric acid/quaternary ammonium salt is in the range of generally from 1/0.8 to 1/2 and preferably from 1/1 to 1/1.5, by weight. If this ratio is outside the above range, the advantages of the present invention are difficult to obtain.

Normally, this vulcanizing agent is incorporated in combination with a scorch preventing agent such as, for example, diphenylurea.

Any ordinarily quaternary ammonium salt can be used. Examples thereof include tetraethylammonium bromide, tetrabutylammonium chloride, n-dodecyltrimethylammonium bromide, octadodecyltrimethylammonium bromide, cetyldimethylammonium chloride, 1,6-diazabicyclo(5,4,0)undecene-7-methylammonium sulfate, cetylpyridium sulfate, trimethylbenzylammonium benzoate, and the like. Among these, octadodecyltrimethylammonium bromide is preferred.

The acrylic copolymer in the AR composition of the present invention can be produced in an ordinary way. For example, the monomers described above are emulsified in water with the aid of an emulsifying agent, along with a polymerization initiator and other additives, and polymerized. The emulsion polymerization product is then separated by salting-out and dried. The polymerization method for the copolymer used in the present invention may be any method for preparing addition polymers. Particularly, the emulsification polymerization, suspension polymerization and solution polymerization are preferred.

The AR composition of the present invention may further contain thereto the above-described vulcanizing agent and other additive ingredients, such as those for use in ordinary rubber compositions, e.g., carbon black, stearic acid, plasticizer, etc., and then kneading the resulting mixture.

One carbon black can be incorporated in the AR composition. Preferably, the carbon black incorporated in the AR composition is a combination of low-structure HAF (hereinafter abbreviated as "HAF-LS") (manufactured by Tokai Carbon Co., Ltd.) and high-structure MAF (hereinafter abbreviated as "MAF-HS") (manufactured by Tokai Carbon Co., Ltd.) from the standpoints of extrudability and other properties. The proportion of HAF-LS to MAF-HS is generally from 60/40 to 40/60, preferably around 50/50, per 100 parts by weight of the copolymer composition. If the proportion of HAF-LS is too small, it is difficult to impart sufficient strength to the vulcanized rubber obtained from the rubber composition. If the MAF-HS proportion is too small, this is apt to pose problems concerning extrudability, resistance to permanent compression set, etc.

HAF-LS herein means a carbon black having an average particle diameter of 26 to 30 nm, an $I_2$ adsorption (according to ASTMD 1510) of below 80 mg/g, and a dibutyl phthalate (DBP) adsorption (according to ASTMD 2414) of 70 to 80 ml/100 g and corresponding to N-326 and N-327 according to the ASTM classification. MAF-HS herein means a carbon black having an average particle diameter of 35 to 40 nm, an $I_2$ adsorption of below 58 mg/g, and a DBP adsorption of 180–190 ml/100 g.

The rubber composition thus prepared may be formed into, for example, a rubber hose or a rubber sheet for gaskets using an extruder or calender, or shaped into a gasket by means of compression, transfer, or injection molding.

The present invention is explained below in more detail with reference to the following examples in order to demonstrate the effects of the invention.

EXAMPLE

One embodiment of the present invention, an engine oil hose, is illustrated in FIG. 1. This hose has a three-layer structure consisting of an inner rubber layer 1 made from the specific AR composition described above, a reinforcing layer 3 made of polyester fibers, and an outer rubber layer 5 made of chloroprene rubber. The constitution of the rubber hose according to the present invention is not limited to the above example, and the hose can have other structures including the single-layer type, four-layer type, reinforcing layer-free type, etc.

EXAMPLES 1–8, COMPARATIVE EXAMPLE, AND REFERENCE EXAMPLE

Each of the copolymers, whose compositions are shown in the upper section of Table 1, was mixed as a rubber component with additive ingredients according to the formulations given below. The resulting mixture was kneaded to form a rubber composition. Each rubber composition was extruded into a 2 mm-thick sheet using an extruder. The rubber sheets of Examples 1 to 8 and Comparative Example were cured by primary vulcanization (150° C.×60 min, hot air) only. The rubber sheet of the Reference Example was cured by primary vulcanization and then secondary vulcanization (160° C.×20 hr, hot air). The cured sheets were examined for initial physical properties and permanent compression set (150° C.×22 hr, 70 hr) in accordance with JIS K 6301.

Formulation for AR Compositions of Examples 1–8 and Comparative Example

| | |
|---|---|
| Rubber component | 100 parts |
| Liquid paraffin | 2 parts |
| Stearic acid | 1 part |
| Anti-aging agent (diphenylamine derivative) | 1 part |
| Carbon black | varying amount |
| Isocyanuric acid (vulcanizing agent) | 1.5 parts |
| Quaternary ammonium salt (vulcanizing agent) | 2.5 parts |
| Diphenylurea (scorch preventing agent) | 0.75 part |

Formulation for AR Composition of Reference Example

| | |
|---|---|
| Rubber component | 100 parts |
| Liquid paraffin | 2 parts |
| Stearic acid | 1 part |
| Anti-aging agent (diphenylamine derivative) | 1 part |
| Carbon black | 55 parts |
| Ammonium benzoate | 0.3 part |
| 1-Cyanoethyl-2-ethylimidazole | 1.4 parts |
| Sodium lauryl sulfate | 1 part | and acrylic acid ester monomer units as main components, wherein said copolymer composition contains an epoxy group-containing crosslinkable compound in an amount of 1.2 to 3.0% by weight and said rubber composition contains an isocyanuric acid and a quaternary ammonium salt as vulcanizing agents.

2. The rubber hose as in claim 1, wherein said epoxy group-containing crosslinkable compound is at least one of glycidyl methacrylate and glycidyl acrylate.

3. The rubber hose as in claim 1, wherein a weight ratio of said isocyanuric acid/said quaternary ammonium salt is 1/0.8 to 1/2 by weight.

TABLE 1

| | Example 1 | Comparative Example | Example 2 | Example 3 | Example 4 | Example 5 | Example 6 | Example 7 | Example 8 | Reference Example 1 |
|---|---|---|---|---|---|---|---|---|---|---|
| <Rubber component> wt % | | | | | | | | | | |
| Ethylene | 8 | 8 | 8 | 8 | 8 | 8 | 8 | 8 | 8 | 8 |
| Vinyl acetate | 12 | 12 | 12 | 12 | 12 | 12 | 12 | 12 | 12 | 12 |
| n-Ba | 80 | 80 | 80 | 80 | 80 | 80 | 80 | 80 | 80 | 80 |
| EA | — | — | — | — | — | — | — | — | — | — |
| GMA | 2.0 | 1.0 | 1.5 | 2.0 | 2.5 | 1.5 | 1.5 | 1.5 | 1.5 | 1.5 |
| <Carbon black> PNR | | | | | | | | | | 55 |
| MAF | | 60 | 60 | 60 | 60 | 65 | | | | |
| MAF-HS | 30 | | | | | | 65 | | | |
| HAF | | | | | | | | 65 | | |
| HAF-LS | 30 | | | | | | | | 65 | |
| <Initial property> | | | | | | | | | | |
| $H_s$ (JISA) | 71 | 66 | 70 | 72 | 75 | 72 | 75 | 69 | 67 | 71 |
| $T_B$ (kgf/cm$^2$) | 108 | 59 | 80 | 88 | 92 | 82 | 105 | 101 | 112 | 119 |
| <Permanent compression set> | | | | | | | | | | |
| CS (22 h) | 29 | 44 | 29 | 23 | 29 | 30 | 35 | 27 | 28 | 23 |
| CS (70 h) | 35 | 58 | 42 | 34 | 38 | 39 | 45 | 35 | 37 | 36 |
| Extrudability | G | G | G | G | G | G | G | B | B | G |

The preferable range for practical use of $H_S$, $T_B$ and CS (70 h) each is 65 to 77, 80 to 150 and 60 or less, respectively.

"PHR" shows the incorporated amount of an additive ingredient per 100 parts of the base polymer ingredient (rubber component).

The evaluation of extrudability was made by visually examining the surface smoothness of the extruded sheet and judging the results based on the following grades.

G . . . no surge or burr.

B . . . with surge or burr.

As is apparent from the results of Table 1, the vulcanized rubber sheets obtained from the AR compositions of the present invention have good initial physical properties and high resistance to permanent compression set. The results of Table 1 also shows that the AR composition of Example 1, in which carbon black is further used not only improves initial physical properties and resistance to permanent compression set, but also shows good extrudability.

While the invention has been described in detail and with reference to specific embodiments thereof, it will be apparent to one skilled in the art that various changes and modifications can be made therein without departing from the spirit and scope thereof.

What is claimed is:

1. A rubber hose having at least one layer comprising a vulcanized acrylic rubber composition which comprises a copolymer composition comprising ethylene monomer units and acrylic acid ester monomer units as main components, wherein said copolymer composition contains an epoxy group-containing crosslinkable compound in an amount of 1.2 to 3.0% by weight and said rubber composition contains an isocyanuric acid and a quaternary ammonium salt as vulcanizing agents.

4. The rubber hose as in claim 1, wherein said vulcanized acrylic rubber composition contains carbon black.

5. The rubber hose as in claim 1, wherein said carbon black comprises low-structure high abrasion furnace and high-structure medium abrasion furnace.

6. The rubber hose as in claim 1, wherein a proportion of said low-structure high abrasion furnace/high-structure medium abrasion furnace is 60/40 to 40/60.

7. The rubber hose as in claim 1, wherein said acrylic acid ester is n-butyl acrylate (n-BA).

8. A rubber hose having at least one layer comprising a vulcanized acrylic rubber composition which comprises a copolymer composition comprising:

ethylene monomer units;

n-butyl acrylate monomer units;

monomer units derived from vinyl acetate;

an epoxy group containing crosslinkable compound in an amount of 1.2 to 3.0% by weight; and an isocyanuric acid and a quaternary ammonium salt as vulcanizing agents.

9. The rubber hose according to claim 8, wherein said ethylene monomer units are present in an amount of 3 to 10 wt %, said n-butyl acrylate monomer units are present in an amount of 70 to 90 wt %, and said monomer units derived from vinyl acetate are present in an amount up to 15 wt %.

* * * * *